(12) United States Patent
Booz et al.

(10) Patent No.: US 8,010,941 B2
(45) Date of Patent: Aug. 30, 2011

(54) METHOD AND SYSTEM FOR DYNAMICALLY GENERATING ENTERPRISE JAVA BEANS DURING INSTALLATION OF A SERVICE COMPONENT ARCHITECTURE APPLICATION

(75) Inventors: David Andrew Booz, Rhinebeck, NY (US); Rashmi Hunt, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 11/745,118

(22) Filed: May 7, 2007

(65) Prior Publication Data
US 2008/0281861 A1 Nov. 13, 2008

(51) Int. Cl.
*G06F 9/44* (2006.01)
(52) U.S. Cl. ......... 717/106; 717/109; 717/118; 717/140
(58) Field of Classification Search .................. 717/106, 717/109, 118, 136–161
See application file for complete search history.

(56) References Cited

U.S. PATENT DOCUMENTS

| | | | |
|---|---|---|---|
| 6,847,981 B2 * | 1/2005 | Song et al. ................... | 717/118 |
| 2004/0111701 A1 * | 6/2004 | Beust ........................... | 717/108 |
| 2005/0262041 A1 * | 11/2005 | Beust et al. ...................... | 707/1 |

OTHER PUBLICATIONS

Milosavljević et al., Automatic code generation for database-oriented web applications; National University of Ireland Maynooth, County Kildare, Ireland; 2002, pp. 59-64.*
Milosavljević et al., User interface code generation for EJB-based data models using intermediate form representations; Computer Science Press, Inc. New York, NY, USA; 2003, pp. 125-128.*
Software deployment; Aquired on Jan. 4, 2011 from http://en.wikipedia.org/wiki/Software_deployment; pp. 1-4.*

* cited by examiner

*Primary Examiner* — Wei Zhen
*Assistant Examiner* — Satish Rampuria
(74) *Attorney, Agent, or Firm* — Cuenot, Forsythe & Kim, LLC

(57) ABSTRACT

A method of dynamically generating stateless session beans (EJBs) during installation of a Service Component Architecture (SCA) composite to expose simple SCA POJO components to Java EE callers. During SCA composite installation, an installation utility receives an installation request for a SCA composite with a simple POJO service. If EJB service binding is defined, the installation utility collects data from a service interface to generate a corresponding bean interface and implementation classes. Generic EJB home, bean and interface class templates are pre-defined using EMF JET templates. Data collected from the service interface is fed into pre-defined EMF JET Templates to generate service-specific EJB classes. The installation utility also matches the java interface to the EJB interface to ensure compatibility. Generated bean method has code snippets to delegate calls to SCA components during runtime. Given a simple SCA POJO Service, the installation utility generates Stateless Session bean without Java EE tooling.

3 Claims, 4 Drawing Sheets

METHOD AND SYSTEM FOR DYNAMICALLY GENERATING ENTERPRISE JAVA BEANS DURING INSTALLATION OF A SERVICE COMPONENT ARCHITECTURE APPLICATION

BACKGROUND OF THE INVENTION

1. Technical Field

The present invention relates in general to Service Oriented Architecture (SOA) and in particular to Java Service Component Architecture (SCA). Still more particularly, the present invention relates to an improved method and system for dynamically generating enterprise java beans (EJBs) for a simple SCA Plain Old Java Object (POJO) service.

2. Description of the Related Art

Service Component Architecture (SCA) provides a programming model for building applications and systems based on Service-Oriented Architecture (SOA). Service Component Architecture (SCA) includes a set of services which are assembled together to provide a particular business need. Basic unit of deployment is a composite which holds set of services which can be accessed externally. A composite can contain one or more components which provide the business function. Components provide their business function through a service and consume a business function through a reference. Composite Service provides one or more business functions which are defined by a service interface. Service is exposed to external callers through service binding. SCA composite can expose its service to Java Enterprise Edition (EE) application through Enterprise Java Bean (EJB) binding (Stateless Session Bean Binding), which exposes composite service through a Stateless session bean.

Java is an object-oriented programming language, which utilizes high-level syntax derived from C and C++, but includes a simpler object model with fewer low-level facilities. Java programs are typically compiled into "bytecode", which can either be interpreted at run time or compiled into native machine code for execution. Java programs utilize configurable security features to enable selective restriction of network and/or file access operations. A bundle of related Java programs is known as a Java platform. A Java platform utilizes an execution engine (also referred to as a virtual machine), a compiler, and a set of standards libraries to ensure compatibility with multiple processors and operating systems (OSs). Note that the terms Java, J2EE and Javabeans are registered trademarks of Oracle and/or its affiliates.

Various Java platforms are available, including Java Standard Edition (SE) for desktop computers, Java EE (formerly known as J2EE) for internet servers and Java Micro Edition (ME) for hand-held electronic devices. In particular, Java EE is typically utilized to develop and run distributed multi-tier architecture applications that utilize modular software components defined by multiple specifications to create enterprise applications that are portable and scalable between different technologies. Conventional Java EE specifications include application programming interface (API) specifications and EJB specifications. Specifically, the EJB specification is a modular, server-side component that provides a standard way to implement "back end" business logic functions (as opposed to "front end" user interface functions) found in enterprise applications. The EJB specification handles common enterprise issues (e.g., persistence, transactional integrity, and security) in a standard way, thereby leaving developers free to concentrate on specific program issues.

SUMMARY OF AN EMBODIMENT

Disclosed is a method, system, and computer program product for dynamically generating Stateless Session Bean to expose a simple Service Component Architecture (SCA) Plain Old Java Object (POJO) service to Java Enterprise Edition (EE) callers through Stateless Session Bean. Generation of stateless Session Bean is completed during installation of SCA composite. SCA composite consists of POJO component which implements business logic and composite exposes its service to the external callers through service bindings. SCA composite is packaged as a simple Java Archive (JAR). Enterprise Java Bean (EJB) service binding exposes SCA service to Java EE callers. During SCA composite installation, the installation utility receives an installation request for a SCA composite which contains a simple POJO service. If EJB service binding is defined, installation, utility collects data from service interface in order to generate corresponding bean interface and bean implementation classes. Generic EJB home, bean and interface class templates are pre-defined using Eclipse Modeling Framework Java Emitter Templates (EMF JET Templates). Data collected on each method of the service interface is fed into pre-defined EMF JET Templates to generate EJB classes specific to that service. The installation utility also matches java interface to EJB interface in order to generate compatible EJB interface. Generated bean method has code snippets to simply delegate the call to SCA component during runtime. The installation utility compiles EJB classes and creates EJB module with appropriate descriptors in order to install. The present invention thus achieves the goal where given a simple SCA POJO Service, the installation utility can generate Stateless Session bean, to expose the service to Java EE callers without the use of sophisticated Java EE tooling.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for dynamically generating enterprise java beans (EJBs) during service component architecture (SCA) application installation.

Figure 1:
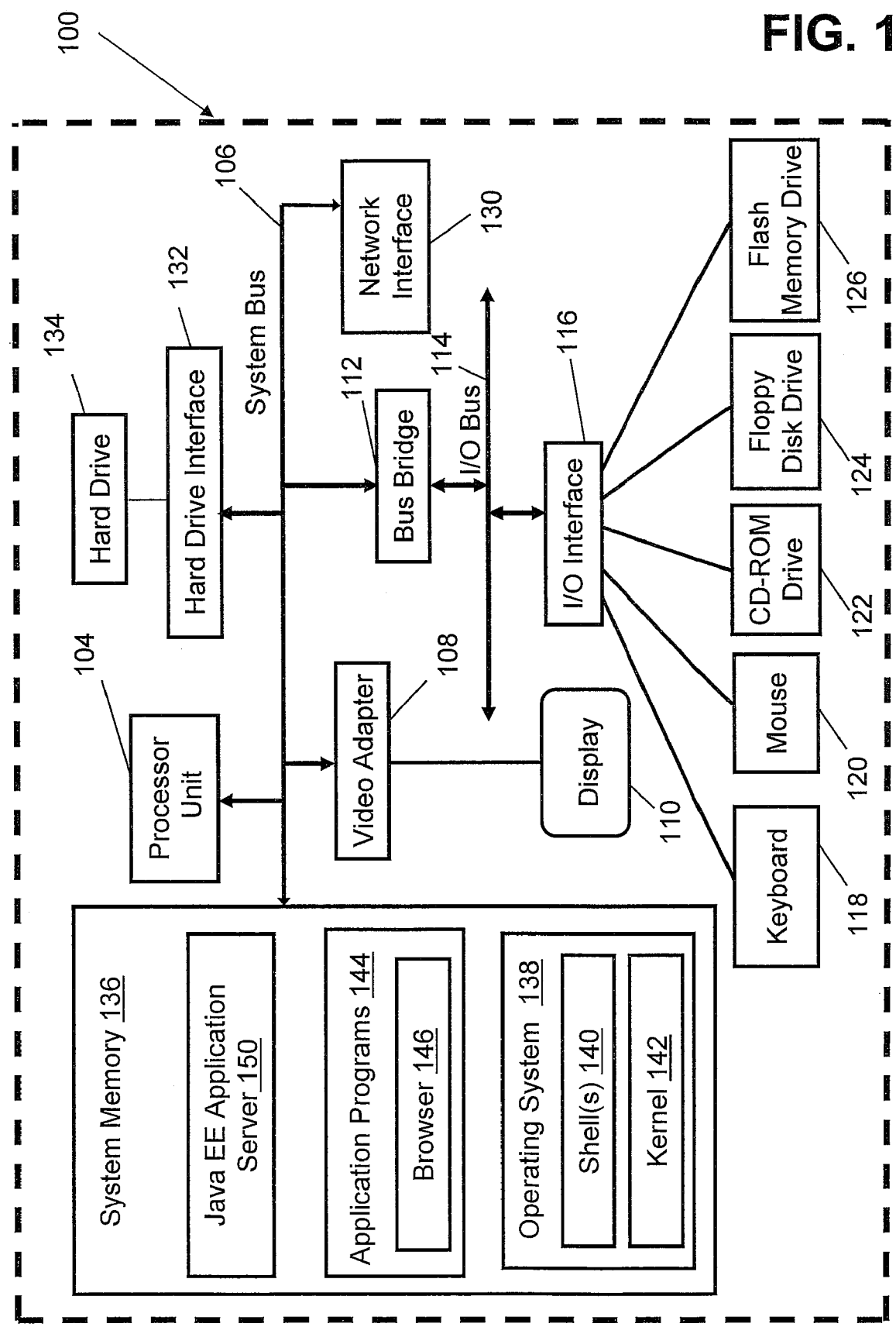
FIG. 1 depicts a high level block diagram of an exemplary data processing system, according to an embodiment of the present invention.

With reference now to FIG. 1, there is depicted a block diagram of an exemplary computer 100, with which the present invention may be utilized. Computer 100 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, floppy disk drive 124, and flash memory drive 126. The format of the ports connected to I/O interface 116 may be any known to those skilled in the art of computer architecture, including but not limited to Universal Serial Bus (USB) ports.

Hard drive interface 132 is also coupled to system bus 106. Hard drive interface 132 interfaces with hard drive 134. In a preferred embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes operating system (OS) 138, application programs 144, and Java Enterprise Edition (EE) Application Server 150.

OS 138 includes shell 140, for providing transparent user access to resources such as application programs 144. Generally, shell 140 (as it is called in UNIX®) is a program that provides an interpreter and an interface between the user and the operating system. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146. Browser 146 includes program modules and instructions enabling a World Wide Web (WWW) client (i.e., computer 100) to send and receive network messages to the Internet.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

Figure 2:
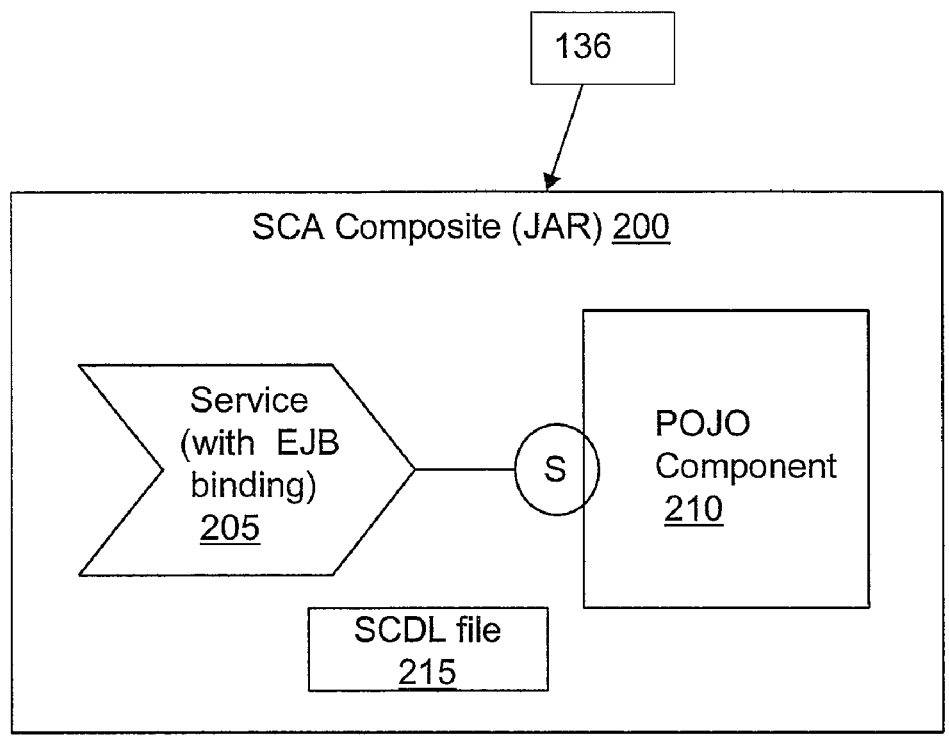
FIG. 2 illustrates a service component architecture (SCA) composite java archive (JAR) file, according to an embodiment of the present invention.

With reference now to FIG. 2, there is depicted SCA composite java archive (JAR) file 200, according to an embodiment of the present invention. SCA composite JAR file 200 is stored within system memory 136 (from FIG. 1). SCA composite JAR file 200 includes composite service with stateless session bean (EJB) binding 205 and plain old java object (POJO) component 210. As utilized herein, service component 210 refers to a POJO component which implements business logic. Composite service declares service interface which is the business interface of the component. This service interface is used to generate compatible Stateless session bean interface during composite installation. In another embodiment, SCA composite JAR file 200 also includes a service component definition language (SCDL) file 215 which describes assembly model for the composite. SCA composite JAR file 200 is utilized during the SCA application installation process illustrated in FIG. 3.

Figure 3:
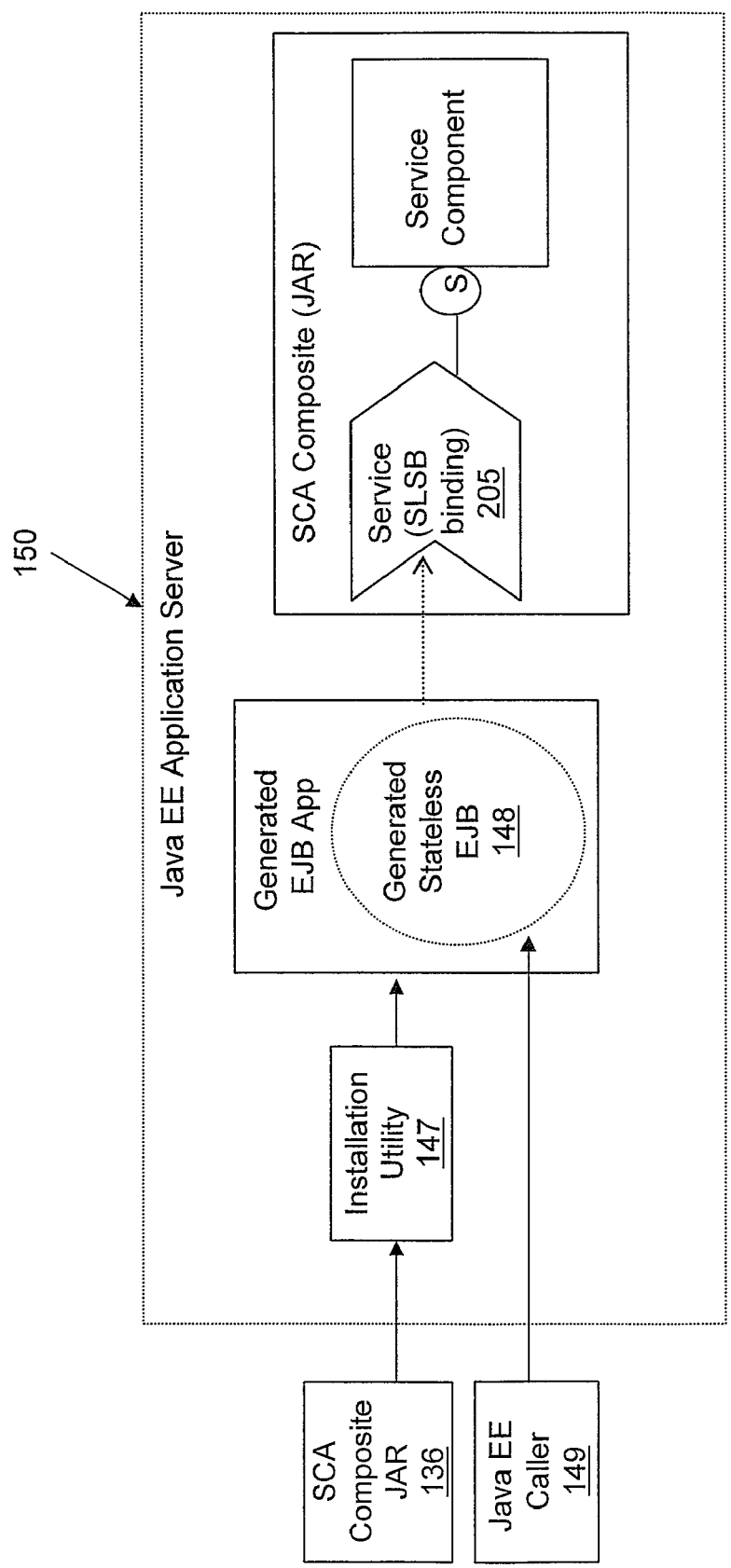
FIG. 3 illustrates a service component architecture (SCA) composite installed on Java EE Application Server.

Turning now to FIG. 3, SCA composite jar 136 is an input to the installation utility 147. Installation utility generates stateless session bean for EJB service binding. Generated EJB 148 and SCA composite get installed on to Java EE application server. During runtime, EJB binding 205 exposes service component 210 to external Java EE callers 149 through generated EJB 148.

Figure 4:
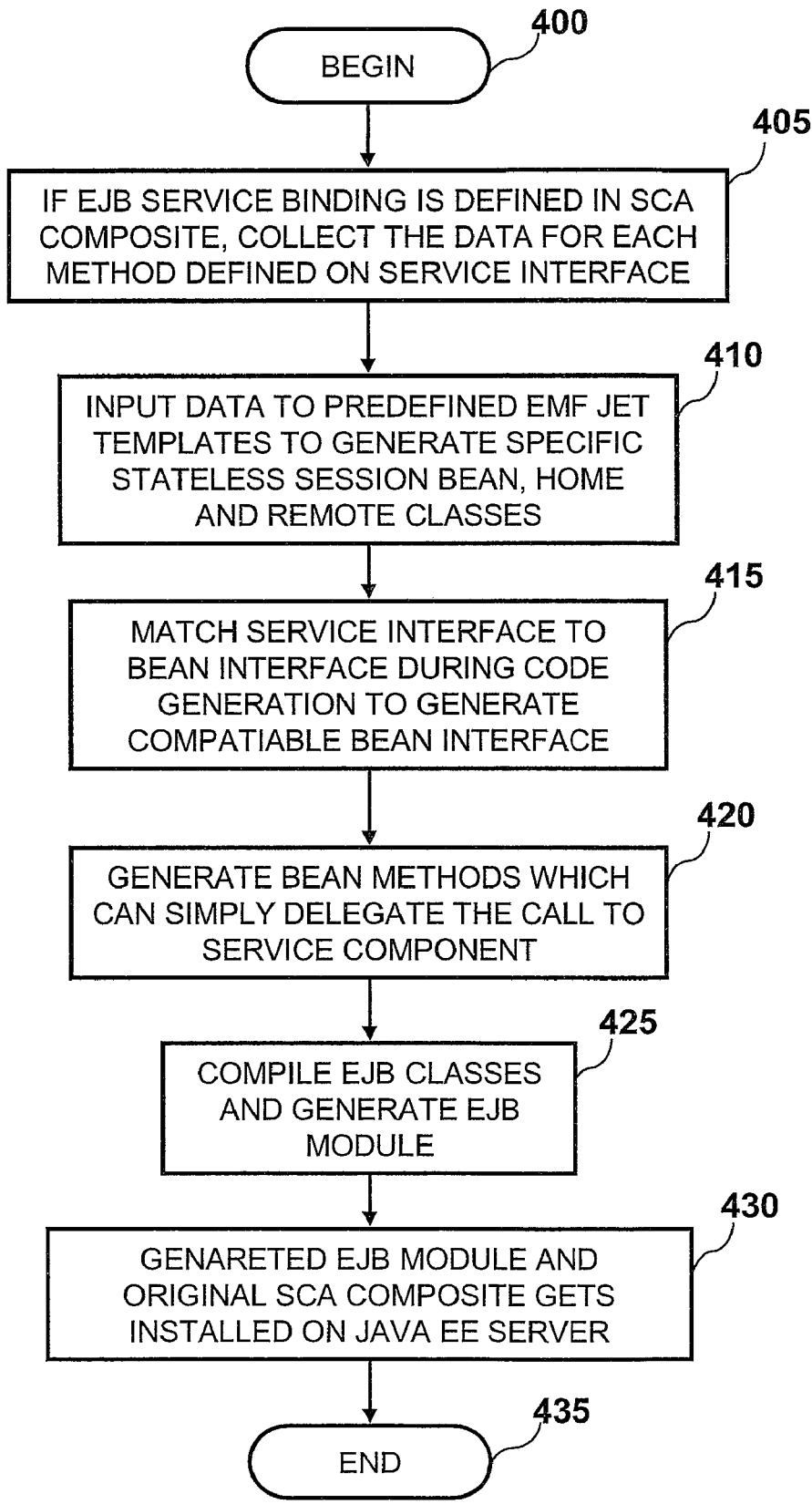
FIG. 4 is a high level logical flowchart of an exemplary method of generating enterprise java beans (EJBs) during SCA application installation, according to an embodiment of the invention.

Turning now to FIG. 4, there is illustrated a high level logical flowchart of an exemplary method of generating EJBs during SCA application installation, according to an embodiment of the invention. The process begins at block 400 in response to installation utility 147 initiating installation of a SCA application. Installation utility 147 looks at the SCA composite (application) and if EJB Service binding is defined, utility then collects data for each method defined on Service binding interface, as depicted in block 405. Installation utility 147 also inputs the data into predefined generic class templates to generate specific Stateless Session Bean, Remote and Home classes for the SCA service as depicted in block 410.

Before generating the EJB interface, installation utility matches service interface to EJB interface to ensure compatibility as depicted in block 415. In one embodiment, utility generates bean methods to simply delegate the in-coming bean call to SCA component as depicted in block 420.

Installation utility 147 compiles bean classes and generates EJB module to install, as shown in block 425. Installation utility 147 installs EJB module and original SCA composite onto Java EE application server 150, as depicted in block 430, and the process ends at block 435.

The present invention thus enables installation utility 147 (FIG. 1) to generate stateless EJBs during SCA application installation without the use of sophisticated Java EE tooling to expose SCA service to Java EE callers. When installation utility 147 receives an installation request for a SCA application, installation utility 147 collects data from service interface in order to generate corresponding EJB interface. Installation utility matches SCA interface to EJB interface to generate compatible EJB interface. Installation utility 147 generates EJB methods to delegate the incoming request to SCA composite during runtime. Installation utility 147 compiles generated bean classes and creates EJB modules. Installation utility 147 installs the EJB module and SCA composite JAR on to Java EE application server.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 4) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of medium used to actually carry out the distribution. Examples of types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   in response to receipt of an installation request for service component architecture (SCA) application:
      inspecting a SCA composite for Enterprise Java Bean (EJB) Service Binding;
      collecting data from a Service interface on each service method;
      inputting collected data into predefined bean templates;
      generating a code snippet in generated bean methods to delegate function calls to a SCA component;
      compiling a plurality of generated EJB classes;
      generating an EJB module which includes said generated EJB classes; and
      generating an EJB, configured to expose a Plain Old Java Object (POJO) component as an EJB application, wherein said EJB exposes said POJO component without the use of Java EE (Java Enterprise Edition) tooling.

2. A computer system comprising:
   a processor unit;
   a memory coupled to said processor unit;
   an installation utility within said memory; and
   code within said installation utility that when executed on said processor unit provides the functions of:
      in response to receipt of an installation request for a service component architecture (SCA) application:
         inspecting a SCA composite for Enterprise Java Bean (EJB) Service Binding;
         collecting data from a Service interface on each service method;
         inputting collected data into predefined bean templates;
         generating a code snippet in generated bean methods to delegate function calls to a SCA component;
         compiling a plurality of generated EJB classes;
         generating an EJB module which includes said generated EJB classes; and
         generating an EJB, configured to expose a Plain Old Java Object (POJO) component as an EJB application, wherein said EJB exposes said POJO component without the use of Java EE (Java Enterprise Edition) tooling.

3. A computer program product comprising:
   a computer recordable type media; and
   program code on said computer recordable type media that when executed provides the functions of:
      in response to receipt of an installation request for service component architecture (SCA) application:
         inspecting a SCA composite for Enterprise Java Bean (EJB) Service Binding;
         collecting data from a Service interface on each service method;
         inputting collected data into predefined bean templates;
         generating a code snippet in generated bean methods to delegate function calls to a SCA component;
         compiling a plurality of generated EJB classes;
         generating an EJB module which includes said generated EJB classes; and
         generating an EJB, configured to expose a Plain Old Java Object (POJO) component as an EJB application, wherein said EJB exposes said POJO component without the use of Java EE (Java Enterprise Edition) tooling.

* * * * *